United States Patent [19]
Valente

[11] 3,921,486
[45] Nov. 25, 1975

[54] MACHINE TOOL FOR WORKPIECES OF EXTENDED DIMENSION

[75] Inventor: Raymond L. Valente, Kankakee, Ill.

[73] Assignee: Manco Mfg. Co., Bradley, Ill.

[22] Filed: July 9, 1973

[21] Appl. No.: 377,559

[52] U.S. Cl. ................... 83/420; 83/278; 83/552; 83/559
[51] Int. Cl.² ............................................ B26F 1/04
[58] Field of Search ............ 83/552, 551, 559, 549, 83/213, 436, 155, 278, 276, 277, 420; 408/35; 29/39–47, 568

[56] References Cited
UNITED STATES PATENTS

| | | | |
|---|---|---|---|
| 842,729 | 1/1907 | Vernet | 83/552 X |
| 1,245,388 | 11/1917 | Sanstrom | 83/552 |
| 1,475,828 | 11/1923 | Holmes | 83/552 |
| 1,926,985 | 9/1933 | Podrabsky | 83/552 |
| 2,278,184 | 3/1942 | Olson | 83/552 X |
| 2,363,208 | 11/1944 | Sulzer | 83/213 X |
| 3,072,003 | 1/1963 | Sirugue | 83/436 X |
| 3,449,991 | 6/1969 | Daniels | 83/552 X |

*Primary Examiner*—Frank T. Yost
*Attorney, Agent, or Firm*—Olson, Trexler, Walters, Buchnell & Fosse, Ltd.

[57] ABSTRACT

A machine tool is provided for forming apertures in a structural steel member or other workpiece of extended dimension. A workpiece clamp engages the workpiece and moves it along a support into and out of a work station. A selected work tool such as a punch die set is mounted on a carrier, and is moved by the carrier into a pre-selected position at the work station. Power means such as a ram operate the punch die set to form the desired apertures. In several embodiments, the carrier comprises a turntable which can be rotated to move the work tools into and out of the work station along an arcuate path.

8 Claims, 9 Drawing Figures

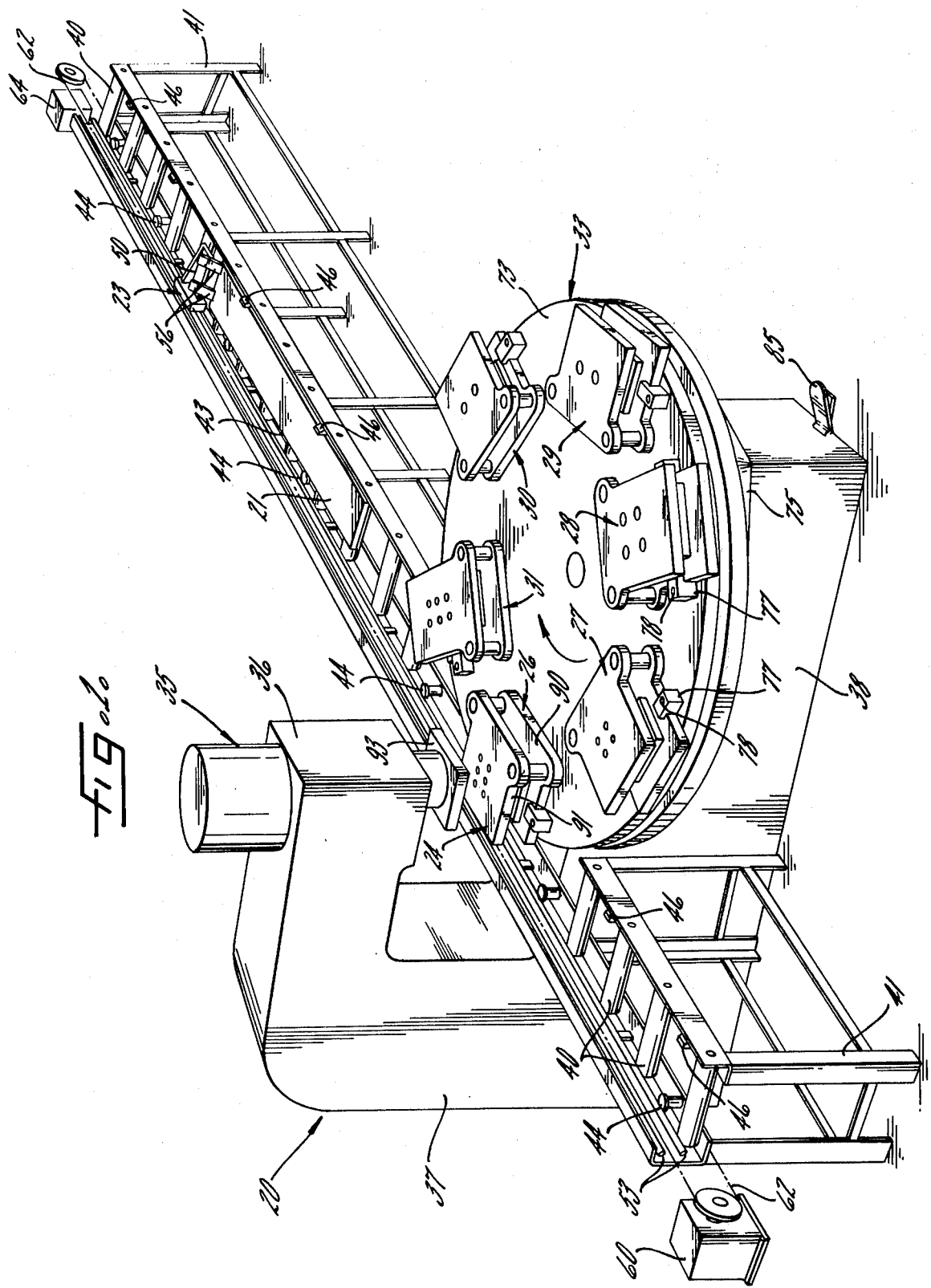

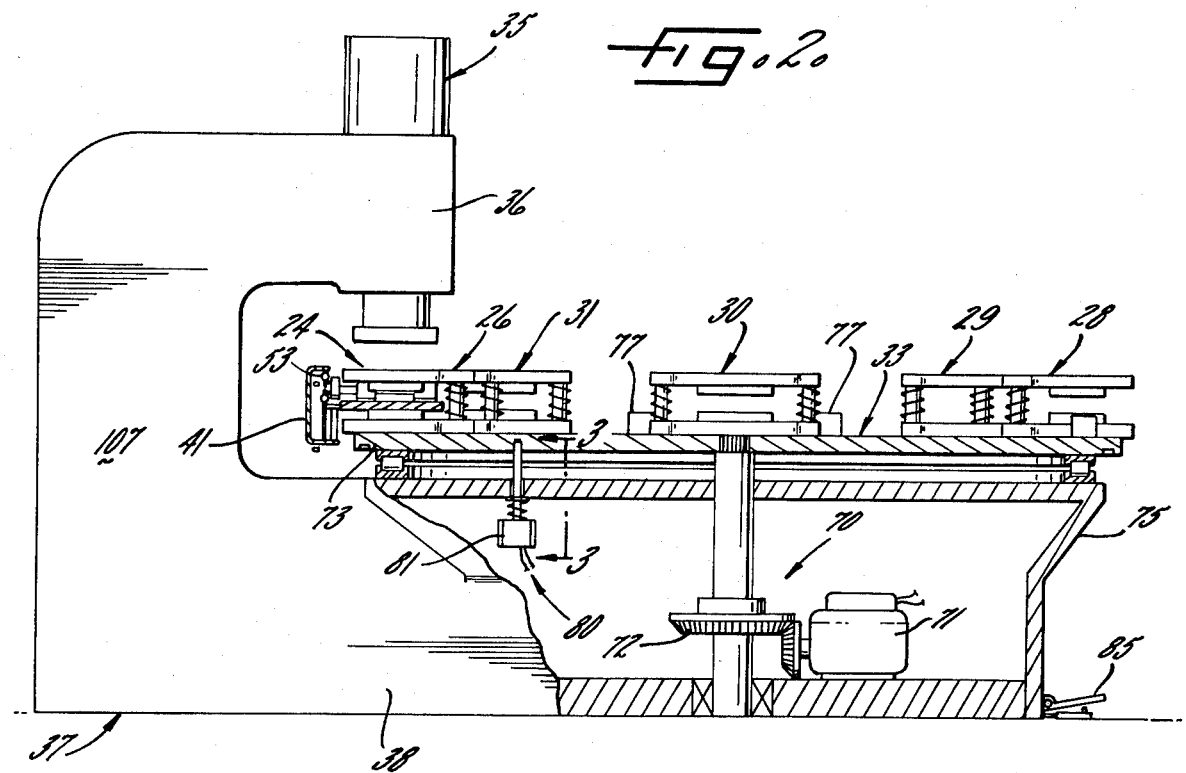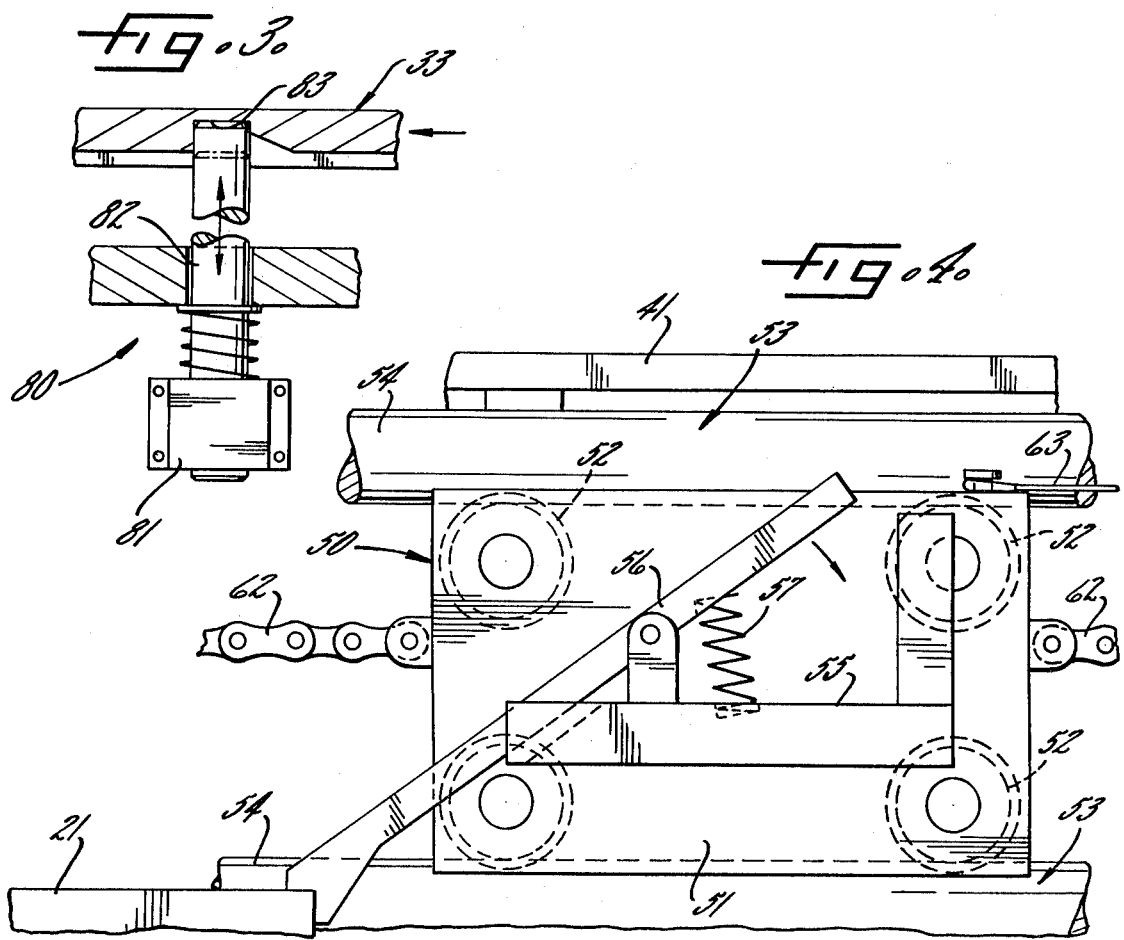

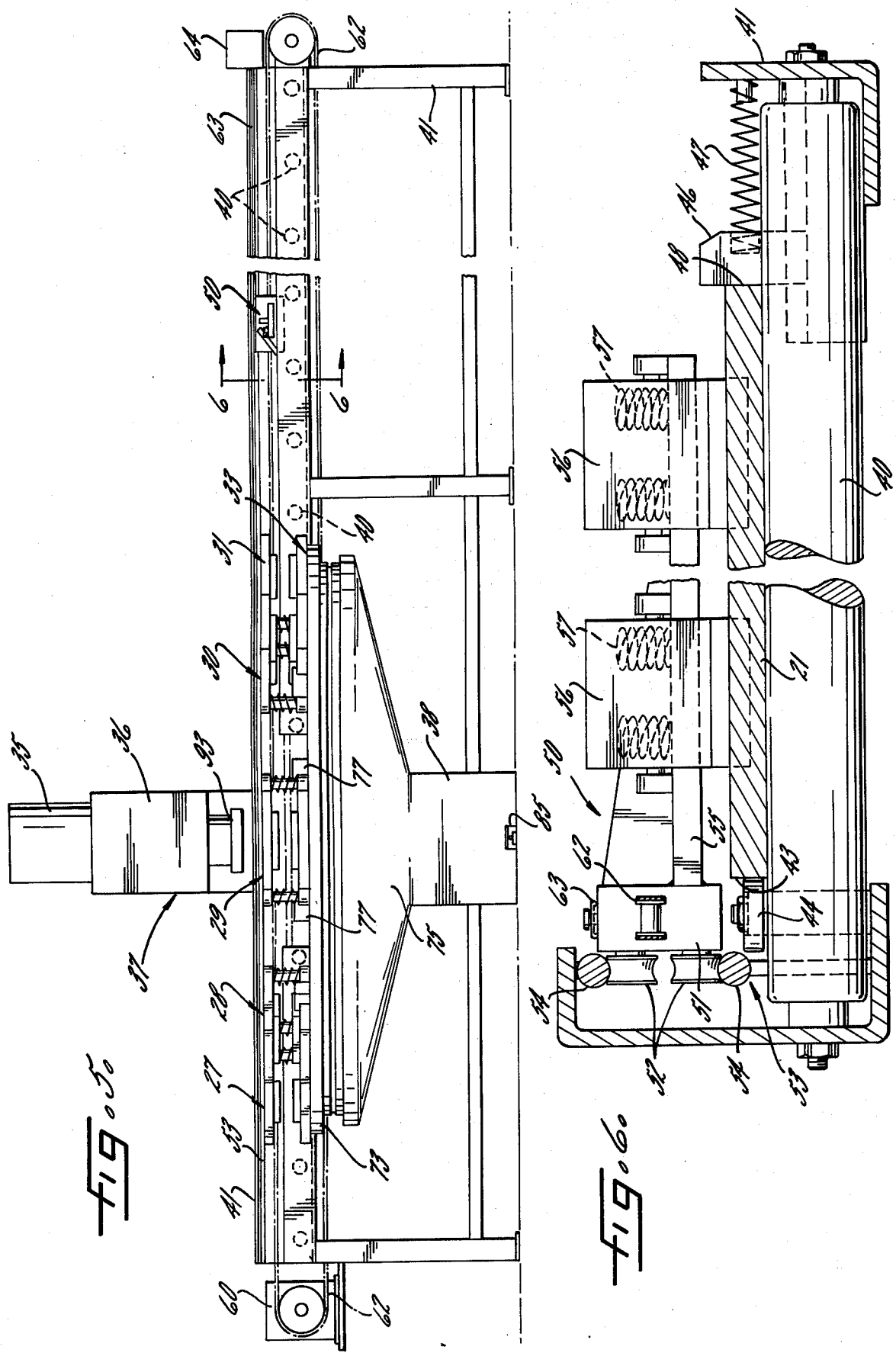

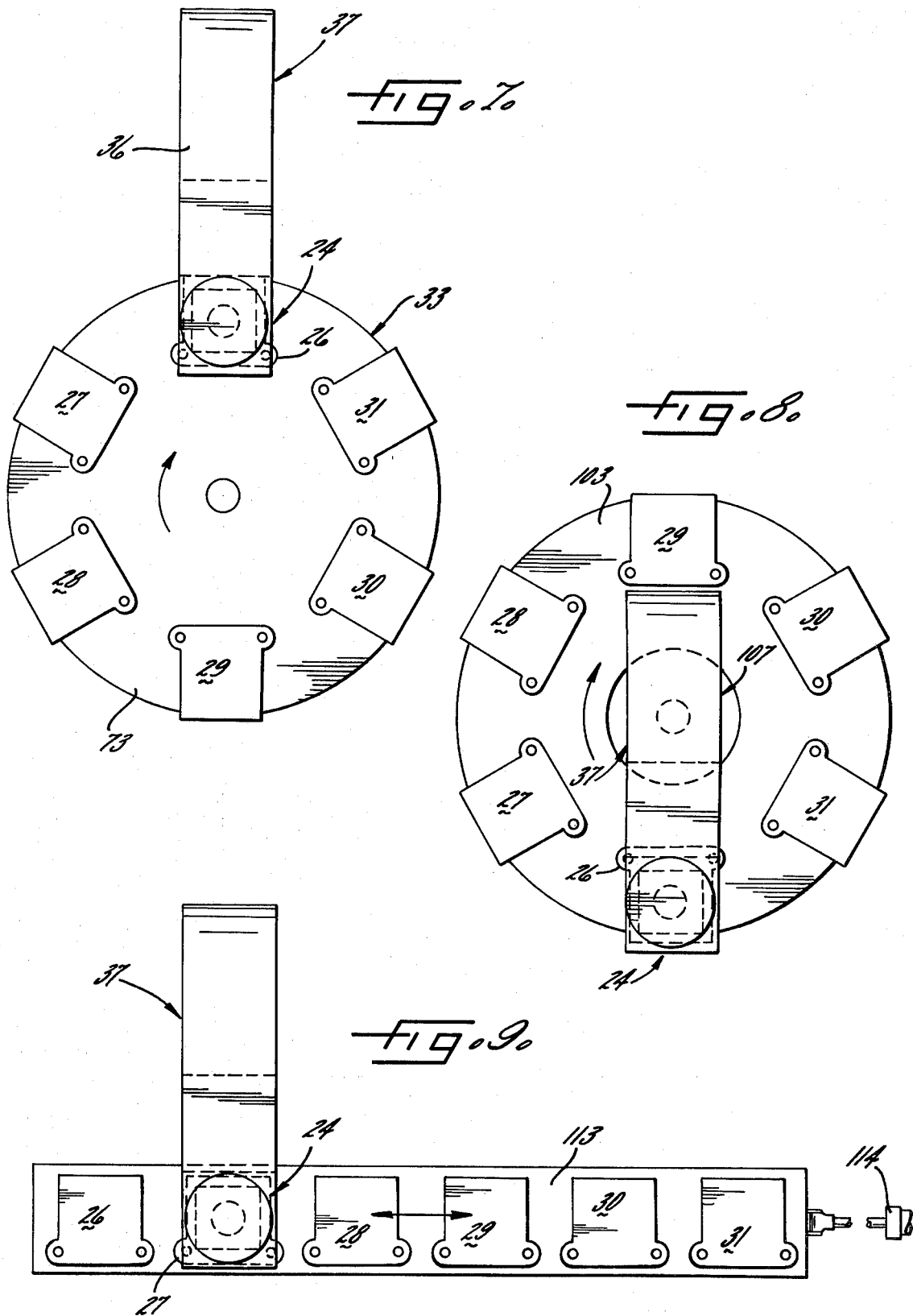

MACHINE TOOL FOR WORKPIECES OF EXTENDED DIMENSION

BACKGROUND OF THE INVENTION

This invention relates generally to machine tools, and more particularly concerns a machine tool for performing any one of a variety of machining operations on a workpiece of extended dimension.

Structural steel members such as I-beams, channel irons, and the like are widely used in the erection of buildings and other structures. Modern civil construction requires that numerous apertures be formed in these members to provide for rivets, bolts, or other interconnections.

Frequently, it is necessary that a plurality of such apertures be formed at the end of an I-beam or other structural member, and at various locations along the length thereof. These apertures often constitute circular holes of various diameters and, occasionally, slots of various elongations and orientations, or otherwise configured apertures. Moreover, it is occasionally desirable to form several apertures oriented in a pre-designated pattern, and to repeatedly form identical apertures and in an identical pattern at spaced intervals along a member. Such repeating hole pattern is often used, for example, in attaching similar beams at spaced locations along a vertical building column.

Hand formation of these bolt holes or other apertures at pre-designated locations spaced along a structural member of extended dimension can be a time consuming and expensive task. To form the described holes at pre-designated location on the structural members, machine tools such as that disclosed in U.S. Pat. No. 3,643,535 have been provided.

It is, therefore, the general object of the present invention to provide a commercially attractive machine tool for performing any of a variety of machining operations on a workpiece of extended dimension.

More specifically, it is an object of the present invention to provide a machine tool for punching any of a variety of differently sized and shaped holes in a workpiece of extended dimension.

It is another object of the invention to provide a machine tool which can quickly and precisely form a number of apertures in a given pattern at several spaced apart locations upon a structural beam, column, or like workpiece of extended dimension.

It is another object to provide a machine tool which is compact, yet which can accommodate workpieces of extended size.

It is a further object to provide a machine tool which can utilize any one of a number of standardized punch die sets to form apertures in a workpiece.

Another object is to provide a machine tool which brings a selected punch die set to a work station quickly, thereby permitting the use of relatively rapid, assembly-line-like operations with structural steel members.

A still further object is to provide a machine tool which firmly supports a selected punch die set at the work station for use with the workpiece.

Other objects and advantages of the invention will become apparent upon reading the following detailed description and upon reference to the drawings. Throughout the description, like reference numerals refer to like parts.

BRIEF DESCRIPTION OF THE DRAWINGS

FIG. 1 is an overall or general perspective view of the novel machine tool of the present invention;

FIG. 2 is a side elevational view of the novel machine tool, portions being broken away to show in further detail various parts of the apparatus;

FIG. 3 is a fragmentary elevational view in partial section taken in the plane of line 3—3 in FIG. 2 showing in further detail typical punch turntable positioning apparatus which can be used with the present invention;

FIG. 4 is a fragmentary plan view of a typical workpiece clamping and grasping mechanism which can be used in connection with the present invention;

FIG. 5 is a front elevational view of the novel machine tool;

FIG. 6 is a sectional view taken substantially in the plane of line 6—6 in FIG. 5 and showing in further detail the workpiece supporting and guiding mechanism of the present invention;

FIG. 7 is a top plan view of one embodiment of the present invention;

FIG. 8 is a top plan view similar to FIG. 7 and showing an alternate embodiment of the present invention;

FIG. 9 is a top plan view similar to FIGS. 7 and 8 and showing yet another embodiment of the present invention.

DETAILED DESCRIPTION

While the invention will be described in connection with a preferred embodiment, it will be understood that it is not intended to limit the invention to that embodiment. On the contrary, it is intended to cover all alternatives, modifications, and equivalents as may be included within the spirit and scope of the invention.

Turning first to FIG. 1, there is shown the novel machine tool 20 of the present invention, here embodied as a punching machine adapted for use with a structural steel member workpiece such as an elongated plate 21 or like member of extended dimension. In general, the machine tool 20 can be considered to include a workpiece support assembly 23 upon which the workpiece 21 rests and along which it is longitudinally moved for introduction to a work station 24. A plurality of work tools such as punch die sets 26–31, inclusive, are oriented along the periphery of a unitary carrier 33 for motion into and out of the work station 24. When the workpiece 21 and a selected die set 26 are appropriately located at the work station 24, a power device such as a ram 35 actuates the selected tool 26 to perform the desired operation upon the workpiece 21. The ram 35 is mounted upon an upper arm 36 of a generally C-shaped frame member 37, while the carrier 33 is mounted on a lower arm 38.

More specifically, as shown in FIGS. 1, 5, 6 and elsewhere, the workpiece support assembly 23 includes a plurality of horizontally disposed roller members 40 which support the workpiece 21 for relatively easy longitudinal translational motion toward and away from the work station 24. These rollers 40 can be mounted upon any convenient structure such as an elevated rack or a table-like support 41 constructed of angle irons or like members.

It is a feature of the invention that the workpiece 21 can be quickly and easily mounted at a pre-determined position relative to the work station 24. To orient the workpiece 21 correctly with respect to the work station 24 in a transverse plane, it is necessary to orient an edge 43 of the workpiece 21 at a known position relative to the selected die set 26 located at the work station 24. To this end, a number of vertically oriented roller members 44 are also mounted upon the support structure 41 to engage one edge 43 of the workpiece and position it at a known datum plane. The workpiece edge 43 is carried snugly against these rollers 44 by a plurality of feet 46 which are resiliently biased, as by springs 47, against an opposite edge 48 or other suitable portion of the workpiece 21.

To orient the workpiece 21 at the work station 24 along the longitudinal plane in the direction of travel of the workpiece, a clamp 50 is included. As illustrated in FIGS. 1, 4 and 5, this clamp 50 can include a base 51 which is provided with rollers 52. The rollers 52 enable the clamp 50 to move along a track 53 comprised of rods 54 or other members mounted upon the support 41 and formed to mate with the rollers 52. Mounted on the base 51 is an extension 55 extending transversely across the support 41 and one or more workpiece-engaging clamp members 56 are, in turn, carried on the extension 55. These clamp members 56 are biased, as by springs 57, into gripping contact with the workpiece 21.

When thus gripped, the workpiece 21 is located at a known position relative to the clamp 50. To locate the clamp device 50 and clamped workpiece 21 relative to the work station 24 in the longitudinal plane, a powered clamp drive device 60 can be provided. Here, the clamp drive 60 is connected by a flexible member such as a roller chain 62 to the clamp 50, and appropriate actuation of the clamp drive 60 will move the workpiece 21 toward or away from the work station 24 along the rollers 40. A sensor cable 63 can be attached to the clamp 50 at one end (see FIG. 4) and paid out of or passed through an associated sensor 64 (see FIG. 1) which is mounted at a pre-determined location relative to the work station 24. The amount of sensor cable passed through the sensor 64 determines the location of the clamp 50 and, hence, the workpiece 21, relative to the work station 24. When the novel machine tool 20 is thus equipped, the workpiece 21 can be precisely located at the work station 24 by actuating the clamp drive 60, and moving the workpiece 21 relative to the work station 24 until the sensor 64 indicates that the workpiece is located at a desired pre-determined spot.

When the workpiece 21 has been located as desired at the work station 24, any one of a plurality of work tools can be actuated by the machine to form the desired apertures in the workpiece. To this end, the movable carrier member 33 mounts a plurality of work tools 26–31 in fixed interrelationship, as illustrated in FIGS. 1 and 7–9, inclusive. The desired work tool (here, a die punch set) is moved into the work station 24 when the carrier is moved to a corresponding preselected position by a carrier drive 70. As illustrated in FIG. 2, the carrier drive 70 used with a turntable-type carrier member 73 can include a motor 71 of known design connected, by suitable gearing 74 or other power transfer means, to the carrier 73. Rotation of the turntable 73 brings any desired die punch set 26–31 into the work station 24. It is to be noted that in the embodiment illustrated in FIGS. 1, 2 and elsewhere, the turntable 73 is entirely supported by an enlarged bearing 75 which is formed as an extended part of the C-frame member lower arm 38, and that the punch die sets 26–31 move into and out of the work station along an arcuate path.

To secure a selected punch die set at the work station 24, a locking device 80 such as that illustrated in FIGS. 2 and 3 can be provided. The illustrated locking device 80 includes an electrically actuated solenoid 81 oriented to urge a locking pin 82 into engagement with a seat 83 formed in the carrier 33.

A suitable switch such as a treadle 85 can be used to actuate, by appropriate circuitry, the drive motor 71; when the desired work tool or punch die set is located at the work station 24, release of the treadle de-energizes the drive motor 71 and energizes the locking solenoid 80 to urge the locking pin 82 into engagement with the turntable 33 and lock the work tool 26 precisely in its desired position at the work station 24.

When the selected tool is properly located at the work station 24, a power means such as the ram 35 is actuated to operate the tool and perform the desired machining operation on the workpiece 21. In the embodiment illustrated, the selected punch die set 26 includes a first or lower member 90 mounted directly upon the turntable carrier member 33 and a second or upper member 91. Upon actuation of the ram member 35, the ram head 93 engages the upper or second die member 91 and causes the desired punching motion. This punching motion of the upper member 91 forms the desired apertures in the workpiece 21. It will be understood that a plurality of apertures will be formed in the workpiece 21 by a single stroke of the ram 35 if the selected die set 26 is provided with a corresponding plurality of punches. Each time the workpiece 21 is repositioned and the ram 35 stroked, another set of identical apertures of identical fixed interrelationship will be formed in the workpiece so long as the selected die set 26 remains at the work station 24. It is to be noted here that both members 90 and 91 of each punch die set are carried upon the single, unitary carrier 33, thus eliminating the paired carrier turrets and the associated gearing required in some prior devices.

It is a feature of the invention that alternative forms of the carrier 33 can be used, and that these alternative forms can be mounted in alternative locations relative to the C-frame member 37. As shown in FIG. 8, the overall size of the novel machine tool can be reduced by forming the carrier 33 in an annular shape 103 and mounting it, in general, about a spine portion 107 of the C-frame member 37 itself. In this embodiment, the punch die sets 26–31 are arrayed about the spine portion 107; in the embodiment shown in FIGS. 1, 5 and 7, on the other hand, the turntable 73 rotates about an axis located outside the C-frame spine 107.

Still another alternate embodiment, shown in FIG. 4, utilizes an elongated rectangular carrier member 113 upon which the various work tools such as punch die sets 26–31 are mounted in rectilinear array. Suitable hydraulic or other carrier drive means 114 can be utilized to linearly translate the carrier 113 and orient it at the appropriate location relative to the work station 24.

I Claim:

1. A machine tool for punching a workpiece of extended dimension, comprising means for supporting the workpiece and locating the workpiece at a predetermined position relative to a work station, a plurality of self-contained punch die sets, each die set including a plurality of punches on an upper member and a corresponding plurality of pre-mated dies on a lower member, a unitary flat-faced movable carrier member removably clamping the self-contained punch die sets thereon in fixed interrelationship, carrier drive means for moving the carrier member to any one of a number of pre-selected positions to locate a selected punch die set at the work station, carrier locking means or locking the carrier precisely in any one of said pre-selected positions, power punch means normally separated from the die sets for first engaging the upper die set member and then compressing the punch die set located at the work station to punch one or more holes in the workpiece, the means for supporting the workpiece including a plurality of fixed, nonadjustable, transverse datum plane-defining means mounted thereon past which the workpiece can be moved, and means on the support means for urging one edge of the workpiece of extended dimension on the support structure abuttively into a pre-determined position against more than one of the fixed, nonadjustable transverse datum plane-defining means, the workpiece support structure further including means for orienting the workpiece of extended dimension at the work station along a longitudinal plane.

2. A machine tool according to claim 1 including a frame member adapted to support at least a portion of the carrier means.

3. A machine tool according to claim 1 wherein said movable carrier member comprises a turntable member rotatable about an axis, said punch die sets moving into and out of said work stations along an arcuate path.

4. A machine tool according to claim 3 wherein said machine tool includes a C-frame member having a spine portion, and wherein said turntable rotates about an axis located outside said spine portion.

5. A machine tool according to claim 3 wherein said machine tool includes a C-frame member having a spine portion, and wherein said turntable rotates about an axis located within said spine portion, and said punch die sets are arrayed about the spine portion.

6. A machine tool according to claim 1 wherein said movable carrier member comprises a linearly translatable slide member, said plurality of punch die sets being mounted thereon in linear array.

7. A machine tool according to claim 1 wherein said workpiece supporting means includes at least one guide member for locating a selected peripheral edge of the workpiece at a data base location.

8. A machine tool according to claim 7 including workpiece clamping means and position sensor means connected to the workpiece clamping means for sensing the location of the workpiece clamping means and any clamped workpiece relative to said work station.

* * * * *